(12) United States Patent
Bezeault et al.

(10) Patent No.: US 12,312,011 B2
(45) Date of Patent: May 27, 2025

(54) DASHBOARD BODY WITH A LACUNARY STRUCTURE AND INTEGRATED FLUID CIRCULATION DUCTS

(71) Applicant: NISSAN MOTOR CO., LTD., Yokohama (JP)

(72) Inventors: Loic Bezeault, Le Chesnay (FR); Robin Law, Garches (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 575 days.

(21) Appl. No.: 17/293,625

(22) PCT Filed: Nov. 8, 2019

(86) PCT No.: PCT/EP2019/080732
§ 371 (c)(1),
(2) Date: May 13, 2021

(87) PCT Pub. No.: WO2020/099274
PCT Pub. Date: May 22, 2020

(65) Prior Publication Data
US 2022/0009557 A1    Jan. 13, 2022

(30) Foreign Application Priority Data

Nov. 15, 2018   (FR) ....................... 1860515

(51) Int. Cl.
| B62D 25/14 | (2006.01) |
| B33Y 80/00 | (2015.01) |
| B60H 1/00  | (2006.01) |
| B62D 29/04 | (2006.01) |

(52) U.S. Cl.
CPC .............. *B62D 25/14* (2013.01); *B33Y 80/00* (2014.12); *B60H 1/0055* (2013.01); *B62D 29/043* (2013.01)

(58) Field of Classification Search
CPC ...... B62D 25/14; B62D 29/043; B33Y 80/00; B60H 1/0055; B29C 64/118
USPC ......................................... 454/254
See application file for complete search history.

(56) References Cited

U.S. PATENT DOCUMENTS

| 5,762,395 A | 6/1998 | Merrifield et al. |
| 10,358,548 B2 | 7/2019 | Boucard et al. |
| 10,406,950 B2 | 9/2019 | Yang et al. |
| 10,919,390 B2 | 2/2021 | Moriizumi et al. |
| 10,940,894 B2 * | 3/2021 | Dormanns ............. B60K 37/02 |
| 10,967,767 B2 | 4/2021 | Yang et al. |
| 2017/0313882 A1 | 11/2017 | Boucard et al. |
| 2018/0134193 A1 | 5/2018 | Yang et al. |

(Continued)

FOREIGN PATENT DOCUMENTS

| CN | 107832563 A | 3/2018 |
| CN | 207595065 U | 7/2018 |
| CN | 207902318 U | 9/2018 |

(Continued)

*Primary Examiner* — Allen R. B. Schult
(74) *Attorney, Agent, or Firm* — Foley & Lardner LLP

(57) ABSTRACT

A dashboard body produced as a single piece, in particular by three-dimensional printing, and having a lacunary structure defining at least one fluid circulation duct having at least one opening. The one or more fluid circulation ducts can be connected to an auxiliary device, such as an air conditioning device, which can be fixed to the dashboard body.

12 Claims, 2 Drawing Sheets

(56) References Cited

U.S. PATENT DOCUMENTS

2019/0329682 A1 10/2019 Yang et al.
2020/0031229 A1 1/2020 Moriizumi et al.

FOREIGN PATENT DOCUMENTS

| EP | 0907545 B1 | | 10/2002 | | |
|----|------------|---|---------|---|---|
| EP | 2347920 A1 | | 7/2011 | | |
| EP | 3 296 138 A1 | | 3/2018 | | |
| GB | 2535764 A | * | 8/2016 | ......... | B60H 1/00564 |
| JP | 2014-141236 A | | 8/2014 | | |
| JP | 2017-533319 A | | 11/2017 | | |
| JP | 2018-522193 A | | 8/2018 | | |
| WO | WO-2018/016613 A1 | | 1/2018 | | |
| WO | WO-2018/061906 A1 | | 4/2018 | | |
| WO | WO 2018/115827 A1 | | 6/2018 | | |

\* cited by examiner

DASHBOARD BODY WITH A LACUNARY STRUCTURE AND INTEGRATED FLUID CIRCULATION DUCTS

The invention relates to a dashboard body with a lacunary structure and integrated fluid circulation ducts.

In the field of motor vehicles, dashboards are installed transversely across the cabin, in front of the driver and front-seat passenger seats and are fixed to the bodyshell of the vehicle, generally in the region of the A-pillars. The dashboard body constitutes the framework of the dashboard. It is covered with a trim or skin that forms the external wall of the dashboard. This dashboard body notably supports various pieces of equipment such as the control panel, the driving instrumentation, air conditioning, car radio and navigation equipment, and various means for operating such equipment.

In the usual way, a dashboard body is made up of numerous assembled elements including the ducts of the vehicle aeraulic system. These are generally components made of polymer or composite material, obtained by molding and assembled subsequently by heading, screwing, etc. Assembling a dashboard body is therefore a relatively complex process and the assembly is relatively heavy.

The invention seeks to overcome these disadvantages by proposing a dashboard body that is produced as a single piece incorporating fluid ducts, for example for the circulation of air.

To this end, one subject of the invention relates to a dashboard body produced as a single piece, notably using an additive manufacturing method known as "three-dimensional printing", also referred to as "3D printing" and exhibiting a lacunary structure defining at least one fluid circulation duct having at least one opening.

What is meant by a "lacunary structure" is a structure including pockets, openings and/or cavities intended to limit the quantity of material. The quantity of material used may correspond to a minimum quantity of material necessary for the mechanical integrity of the structure for the envisioned use. This quantity of material may be determined by calculating the loads that the structure has to be able to withstand, for example in order to allow it to withstand its own self-weight, in order to withstand a distributed surface load, in order for it to be attached to the bodyshell of the vehicle, in order to incorporate ancillary elements (fixing interfaces, incorporating the HVAC (heating, ventilation and air conditioning) unit, for incorporating the components of the storage volumes, etc.).

The lacunary structure of the dashboard body according to the invention thus takes the form of a network of material forming mesh cells and nodes. Such a network may be made up of parts similar to hollow vessels, semi-solid parts (with an interior structure also referred to as a lattice) or solid parts which are interconnected, at least some of these vessels being hollow and able to be used for the circulation of fluid.

In one embodiment, the lacunary structure may thus define a plurality of fluid circulation ducts of which at least some are fluidically interconnected. In other words, the fluid may follow a path formed by several interconnected hollow vessels.

The opening or openings allow the fluid circulation duct or ducts to be connected to an ancillary device distinct from the dashboard body, for example a heating, ventilation or air conditioning device or some other device or allow connection to the environment outside the body, or both.

The dashboard body may thus exhibit at least one opening situated on an external face of a volume defined by the dashboard body.

For example, such an opening may be situated on a face of the dashboard body that is situated on the inside of the vehicle cabin when the dashboard body is mounted in a vehicle. The circulating fluid may then be air intended for the cabin.

As an alternative or in combination, the dashboard body may exhibit at least one opening situated inside a volume defined by the dashboard body. Such an opening may be used for connecting the duct to an ancillary device.

Note that it is possible that the fluid might not be intended for the cabin, so the opening or openings may then be provided in a zone internal to the volume of the body of the board so as to be connected directly and only to one or more ancillary devices.

The lacunary structure of the dashboard body may also define at least one connection box into which one or more fluid circulation ducts open and which exhibits an opening intended to be coupled to an ancillary device distinct from the dashboard body. These connection boxes may potentially exhibit another opening opening onto an external face of a volume defined by the dashboard body.

The dashboard body may include a lacunary structure internal framework of one piece with an external skin at least in part delimiting a volume of the dashboard body, the external skin having an external surface chosen from a lacunary surface, a solid surface, a surface exhibiting one or more lacunary and solid zones. In particular, this external skin may correspond to a part visible from inside the cabin when the body is mounted inside the vehicle.

The dashboard body according to the invention is obtained by three-dimensional printing, for example using fused deposition modeling, fused filament fabrication or selective laser sintering. To this end, any material that can be printed using such techniques can be used.

Advantageously, the material may be a polymer material chosen from acrylonitrile-butadiene-styrene (ABS), polypropylene (PP), polylactic acid (PLA). The polymer material may also be reinforced with glass or carbon particles.

The invention also relates to a dashboard including a dashboard body according to the invention and at least one ancillary device distinct from the dashboard body, the latter including a fluid circuit connected to at least one fluid circulation duct of the body via an opening thereof.

In one embodiment:
the ancillary device is chosen from a ventilation device, a heating device and an air conditioning device,
the fluid circuit is an aeraulic-fluid circuit connected to at least one fluid circulation duct of the body, of which one end is in fluidic communication with the outside of the dashboard body, notably intended to open into part of the cabin of the vehicle when the dashboard is mounted inside the vehicle.

The invention finally relates to a vehicle including a dashboard according to the invention.

In one embodiment, when the ancillary device is chosen from a ventilation device, a heating device and an air conditioning device, the fluid circulation duct connected to an aeraulic circuit of the ancillary device may open into part of the cabin of the vehicle.

The invention is now described with reference to the nonlimiting attached drawings in which.

In the present description, the terms front, rear, upper, lower refer to the front and rear directions of the vehicle, when the dashboard body is mounted transversely across the inside of the vehicle. The axes X, Y, Z correspond respectively to the longitudinal (front to rear), transverse and vertical axes of the vehicle.

Figure 1:
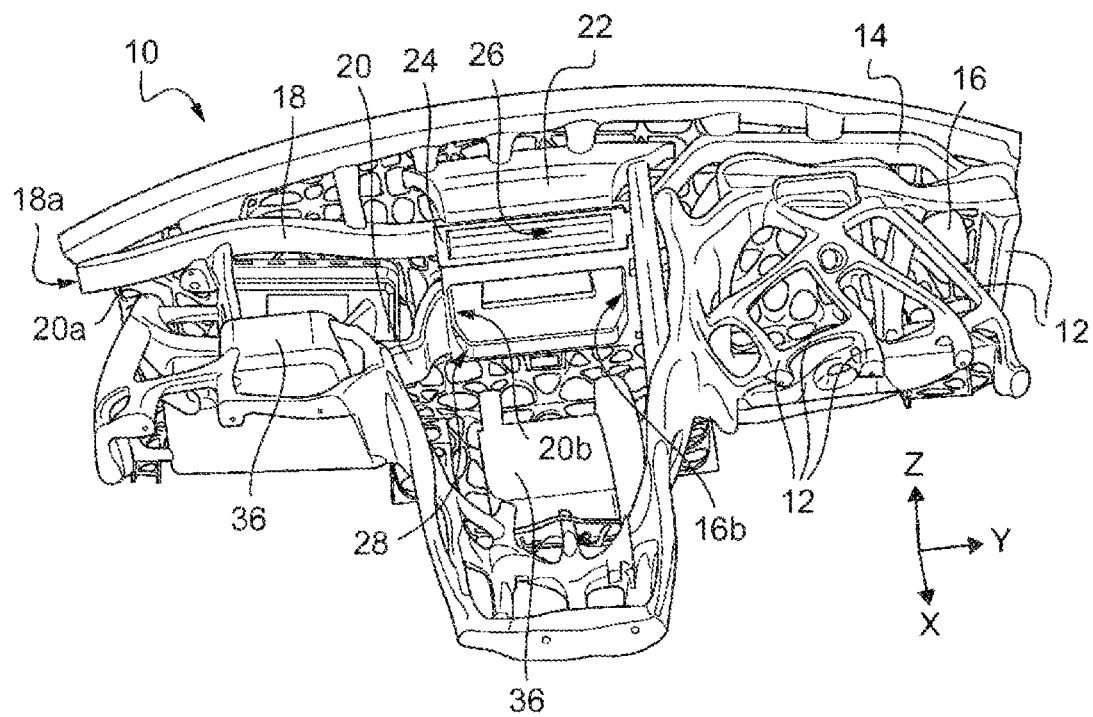
FIG. 1 is a perspective view of a dashboard body according to one embodiment of the invention, the body being viewed from underneath from the front of the vehicle.

FIG. 1 depicts a dashboard body 10 produced as a single piece, in this instance by three-dimensional printing. According to the invention, this dashboard body 10 has a lacunary structure.

As visible in FIG. 1, it is thus possible to make out a network of interconnected parts similar to vessels 12. The thickness and the shape of each of these vessels 12 can be chosen in such a way as to obtain a structure that can be used for the desired purpose, for example meeting conditions of mechanical strength, stiffness, or the like. Similarly, the zones of interconnection of these vessels 12 may have various shapes and various sizes. Finally, these vessels may be hollow or solid or contain a specific internal structure (be semi-solid). It will also be noted that hollow vessels may contain an internal structure forming a network (cellular structure) that reinforces the structure of the vessel while at the same time allowing a fluid to circulate inside the vessel.

According to the invention, the lacunary structure defines at least one fluid circulation duct having at least one opening. In other words, the duct or ducts are incorporated into the structure and produced as a single piece therewith.

In the example depicted, it is possible to discern two ducts 14, 16 situated to the right-hand side of FIG. 1, two ducts 18, 20 situated to the left-hand side of FIG. 1, and a duct 22 situated in the center.

The ducts 14, 18 and 22 each include:
an opening 14a, 18a and 22a which opens onto an external face of a volume defined by the dashboard body 10, and
another opening 14b, 18b and 22b which opens to the inside of the volume defined by the dashboard body 10.

In the example depicted, this second opening 14b, 18b and 22b opens to the inside of a connection box 24 defined by the lacunary structure.

This connection box 24 itself exhibits an opening 26 for its connection to an ancillary device 30, in this instance an air conditioning device.

Similarly, the ducts 16, 20 each include:
an opening 16a, 20a which opens onto an external face of the volume defined by the dashboard, and
another opening 16b, 20b which opens to the inside of the volume defined by the dashboard body.

In this instance, this second opening 16b, 20b opens to the inside of another connecting box 28 defined by the lacunary structure. This second box 28 is positioned immediately beneath the box 24. It exhibits an opening 28a opening onto an external face 11 of the volume defined by the dashboard body 10 and an opening 28b for connecting it to the ancillary device 30.

Of course, the present invention is not limited by the number of ducts, by the number of openings thereof, or by their shape or arrangement. Notably, the shape and arrangement of the ducts may be dependent on the mechanical integrity desired for the dashboard body insofar as these ducts form an integral part of the structure.

Furthermore, the ducts depicted are, in this instance, interconnected via connecting boxes. It is, however, conceivable for these ducts to be connected to one another directly.

It will thus be appreciated that creating the dashboard body using 3D printing permits a very large number of possible architectures.

Figure 2:
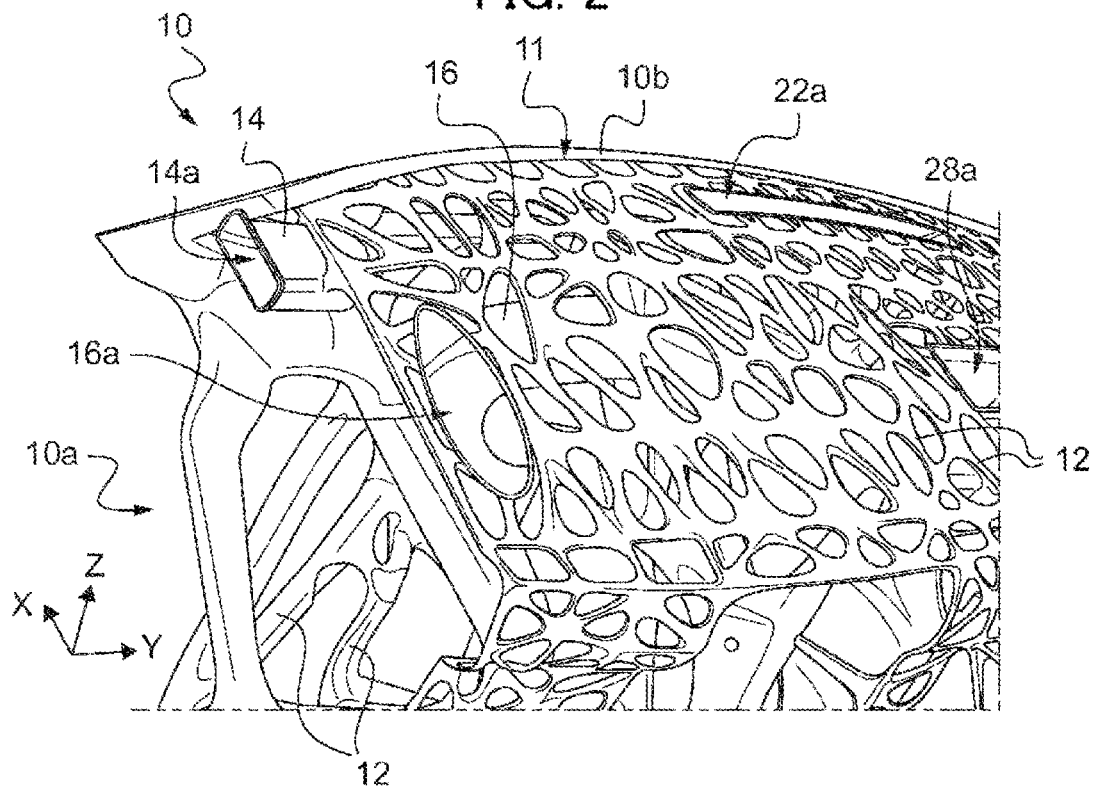
FIG. 2 is a partial perspective view showing the top of the dashboard body from the cabin side.
Figure 3:
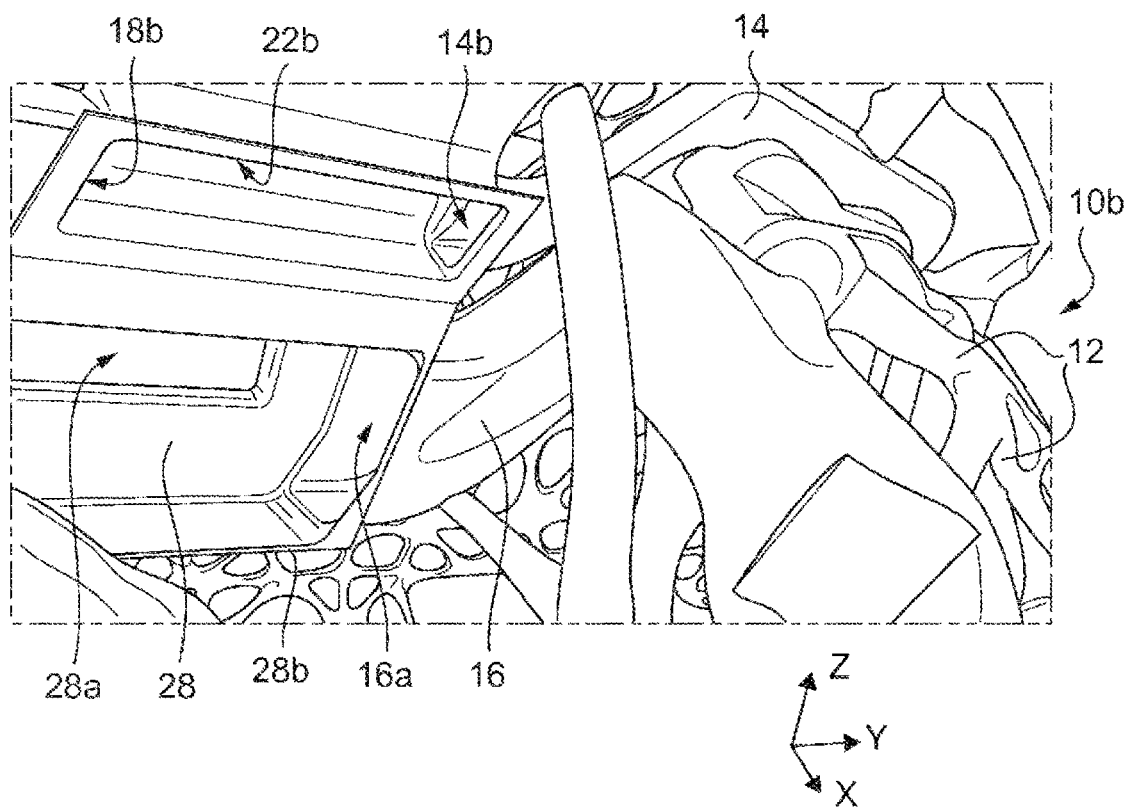
FIG. 3 is a partial perspective view showing an internal zone of the dashboard body facing toward the front of the vehicle.

In the example depicted, the dashboard body 10 includes an internal framework 10a of lacunary structure produced as a single piece with an external skin 10b partially delimiting a volume of the dashboard body (FIG. 2).

In this example, the external skin 10b corresponds substantially to the face of the dashboard body that is visible from inside the cabin when the dashboard body is mounted inside the vehicle.

In the example, the external skin 10b itself has a lacunary structure. Thus, it exhibits an external surface 11 including lacunary and solid zones, thus resembling an open-mesh fabric or network. It will also be noted that the internal framework 10a includes vessels 12 which overall are thicker than those that make up the external skin 10b.

Such an openwork external skin 10b may potentially be covered with a continuous (solid) technical surface, not depicted, such as a textile or some other surface for example. As an option, the internal framework 10a may also be covered with the same surface in the lower part of the board.

In a variant, this external skin 10b could exhibit a solid external surface or else a surface exhibiting one or more lacunary and solid zones (this is not depicted).

Figure 4:
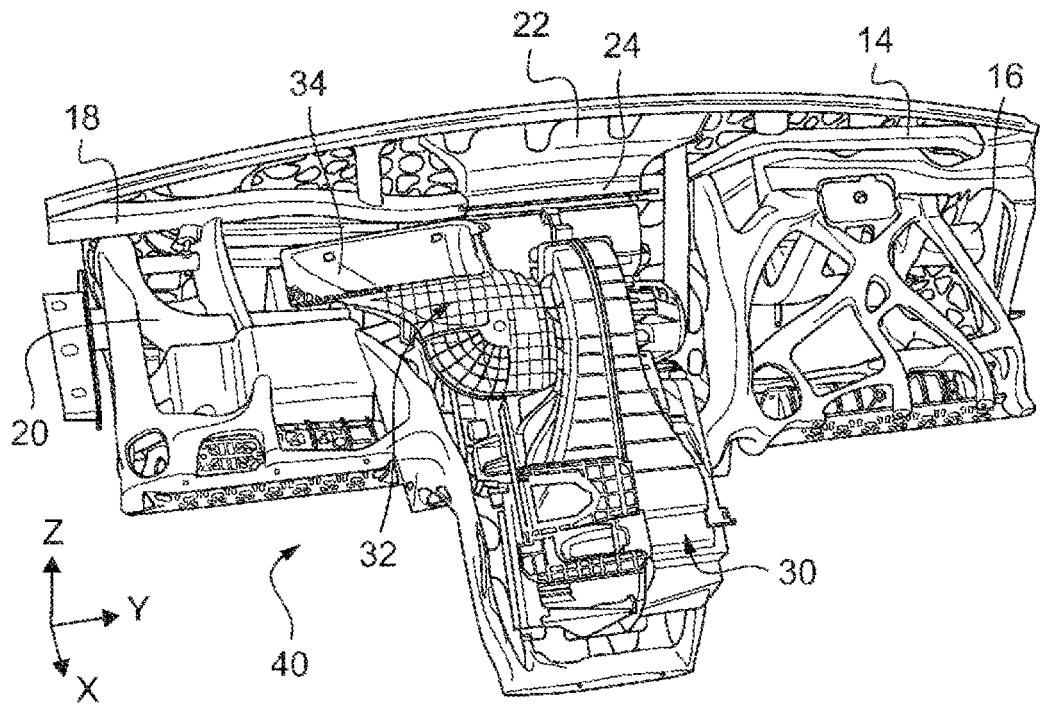
FIG. 4 is a perspective view of a dashboard body according to one embodiment of the invention notably including the dashboard body depicted in FIGS. 1 to 3 and an air conditioning device.

FIG. 4 depicts a dashboard 40 including the dashboard body 10 described hereinabove and an ancillary device 30, in this instance an air conditioning device. This ancillary device 30 is distinct from the dashboard body and attached thereto, for example by means of screws, using heading, rivets, etc. (which are not depicted).

This ancillary device 30 includes an aeraulic fluid circuit 32 of which it is possible to discern an air intake opening 34 in FIG. 4. The aeraulic fluid circuit 32 is connected to the ducts 14 to 22 of the dashboard body via the connecting boxes 24 and 28.

Incorporating the ducts 14 to 22 of the dashboard body into the actual structure of this dashboard body allows an appreciable reduction in the number of components that have to be assembled and allows the weight of the dashboard body to be lightened considerably. It is thus possible to produce a dashboard body weighing around 13 kg as opposed to over 23 kg for a conventional dashboard body made up of several assembled components.

Furthermore, the shape and layout of the various ducts is no longer constrained by the fixings between these elements.

3D printing also allows other functions to be incorporated into the dashboard body, such as boxes 36 to form storage receptacles, housings for airbags, etc.

In the above description, the term "dashboard body" refers to the main dashboard structure, which defines its overall shape, its volume and its dimensions, with a mechanical strength and stiffness necessary for its use as a dashboard, for accommodating driving instruments, various accessories and storage compartments.

The invention claimed is:

1. A dashboard body which is a single-piece lacunary structure being a single piece produced by three-dimensional printing and defining at least one fluid circulation duct having at least one opening, wherein the single-piece lacunary structure defines at least one connection box into which the at least one fluid circulation duct opens and which is provided with an opening configured to be coupled to at least one ancillary device distinct from the dashboard body;

wherein the at least one connection box comprises a first connection box and a second connection box positioned below the first connection box such that the second connection box is farther from the at least one fluid circulation duct than the first connection box, the first connection box comprising a first opening structured to couple to the at least one ancillary device, wherein the second connection box comprises a second opening structured to open to an external face of a volume defined by the dashboard body and a third opening structured to couple to the at least one ancillary device; and wherein the second opening and the third opening are disposed on opposite sides of the second connection box.

2. The dashboard body as claimed in claim 1, wherein the at least one fluid circulation duct comprises a plurality of fluid circulation ducts of which at least some are fluidically interconnected.

3. The dashboard body as claimed in claim 1, wherein the dashboard body is provided with at least one opening situated on an external face of a volume defined by the dashboard body.

4. The dashboard body as claimed in claim 1, wherein the dashboard body is provided with at least one opening situated inside a volume defined by the dashboard body.

5. The dashboard body as claimed in claim 1, wherein the dashboard body comprises a lacunary structure internal framework of one piece with an external skin, the external skin at least in part delimiting a volume of the dashboard body, the external skin having an external surface selected from a lacunary surface, a solid surface, or a surface provided with at least one of a lacunary zone or a solid zone.

6. The dashboard body as claimed in claim 1, wherein the dashboard body is made of a polymer material selected from acrylonitrile-butadiene-styrene, polypropylene, or polylactic acid.

7. A dashboard comprising the dashboard body as claimed in claim 1 and the at least one ancillary device distinct from the dashboard body, the at least one ancillary device comprising a fluid circuit connected to the at least one fluid circulation duct of the body via the opening thereof.

8. The dashboard as claimed in claim 7, wherein:
a) the at least one ancillary device is selected from a ventilation device, a heating device or an air conditioning device; and
b) the fluid circuit is an aeraulic-fluid circuit connected to the at least one fluid circulation duct of the dashboard body, of which one end is in fluidic communication with the outside of the dashboard body.

9. A vehicle comprising the dashboard of claim 7.

10. The dashboard body of claim 1, wherein the at least one fluid circulation duct is disposed to open to an inside portion of the at least one connection box.

11. The dashboard body of claim 1, wherein the single-piece lacunary structure comprises a network of mesh cells and nodes, at least a part of the network being formed of interconnected vessels, and at least a part of the vessels constituting the at least one fluid circulation duct.

12. The dashboard body of claim 11, wherein the dashboard body comprises an external skin and an internal framework, the external skin at least partly delimiting a volume of the dashboard body and having at least one lacunary zone and at least one solid zone, and wherein the vessels of the internal framework are thicker than the vessels of the at least one lacunary zone.

* * * * *